United States Patent
Ishisaki

(10) Patent No.: US 7,958,678 B2
(45) Date of Patent: Jun. 14, 2011

(54) BUILDING COVERED WITH RESIN FILMS

(75) Inventor: Yoshiaki Ishisaki, Tokyo (JP)

(73) Assignee: Asahi Glass Green-Tech Co., Ltd., Tokyo (JP)

( * ) Notice: Subject to any disclaimer, the term of this patent is extended or adjusted under 35 U.S.C. 154(b) by 1217 days.

(21) Appl. No.: 11/017,963

(22) Filed: Dec. 22, 2004

(65) Prior Publication Data
US 2005/0191450 A1    Sep. 1, 2005

(30) Foreign Application Priority Data
Dec. 26, 2003  (JP) .................. 2003-433368

(51) Int. Cl.
*E04B 1/12* (2006.01)
(52) U.S. Cl. ............... 52/63; 52/408; 52/302.1; 52/222; 47/17; 47/20.1; 47/31; 428/167; 454/237; 135/90
(58) Field of Classification Search ............ 47/17, 20.1, 47/31; 126/674; 52/408–413, 63, 222, 302.1
See application file for complete search history.

(56) References Cited

U.S. PATENT DOCUMENTS

| | | | |
|---|---|---|---|
| 4,665,670 A * | 5/1987 | van den Burg | 52/222 |
| 4,726,411 A | 2/1988 | Conley | |
| 5,009,540 A | 4/1991 | Nolan | |
| 5,197,238 A | 3/1993 | Peleg | |
| 5,655,335 A * | 8/1997 | Vermeer | 52/66 |
| 6,079,152 A * | 6/2000 | Hou | 47/17 |
| 6,434,879 B1 * | 8/2002 | Safwat et al. | 43/9.95 |
| 2002/0098371 A1 * | 7/2002 | Higuchi et al. | 428/515 |

FOREIGN PATENT DOCUMENTS

| | | |
|---|---|---|
| DE | 90 17 542 | 6/1991 |
| FR | 2 827 900 | 1/2003 |
| JP | 58-155948 U | 10/1983 |
| JP | 06062682 A * | 3/1994 |
| JP | 6-205613 | 7/1994 |
| JP | 11-42023 | 2/1999 |
| JP | 2004-33065 | 2/2004 |

OTHER PUBLICATIONS

Patent Abstracts of Japan, JP 06-205613, Jul. 26, 1994.
Patent Abstracts of Japan, JP 11-042023, Feb. 16, 1999.

* cited by examiner

*Primary Examiner* — Holly Rickman
*Assistant Examiner* — Linda Chau
(74) *Attorney, Agent, or Firm* — Oblon, Spivak, McClelland, Maier & Neustadt, L.L.P.

(57) ABSTRACT

A building covered with resin films 10, comprises a frame 11 constituting the bone structure of a building and a roof and/or a wall formed by stretching transparent resin films 20 on the frame, wherein the lower edge portion of a transparent resin film is held by a retainer 30 to fix it to the frame and a water-permeable sheet 40 is put with its upper edge portion being positioned at the inner surface side of the resin film and its lower edge portion being positioned at the outside of the building whereby condensed water resulted on the surface of the film facing the inside of the building is discharged to the outside thereof without losing the heat insulation effect.

20 Claims, 9 Drawing Sheets

BUILDING COVERED WITH RESIN FILMS

The present invention relates to a building covered with resin films suitable for, for example, an agricultural house, in particular, such one that water condensed on an inner surface side of, in particular, a resin film can be discharged effectively to the outside of the building.

As an agricultural house being a horticultural facility has been known as a building comprising a frame formed by connecting metallic members such as pipes and angles and resin films stretched on the frame. This agricultural house had the disadvantage that the inside of the house was apt to be humid because warm air inside the house contacts the resin films facing inside the house, water was condensed on the resin film which had a reduced temperature by being exposed to ambient air, the water dropped along the inner surface side of the films, and the dropped water evaporated again in air. The humid house forms the environment in which disease-causing bacteria easily spread. Accordingly, it has been desired to discharge the condensed water to the outside of the house.

To achieve this purpose, a drainage apparatus is known, the apparatus being constructed in a manner that a watershoot-like water catching member is provided in contact with the inner surface side of the films of the house, extending in a horizontal direction so that falling condensed water is received by the water catching member, and the received water is discharged to the outside of the house through a drain pipe connected to a suitable portion such as an end of the water catching member.

Further, patent document 1 (JP-A-11-42023) discloses a curtain film formed by perforating in a vinyl film for agricultural use, a single drain/ventilation opening having a diameter of from 2 mm to 5 mm or a plurality of different kinds of holes having an averaged diameter of at least 3 mm with appropriate intervals, the vinyl film having working skirts at both vertical or lateral sides in its longitudinal direction.

Further, patent document 2 (JP-A-6-205613) discloses a house provided with a dropping water discharging unit, as a horticultural facility in which at least two covering materials are disposed so that at the joining portion (portion A) of overlapped inner and outer covering materials, at least the upper edge portion of the inner covering material is apart with a predetermined distance (portion B) from the outer covering material without complete close contact.

However, the drainage apparatus provided with the water-shoot-like water catching member provided in contact with the inner surface side of the film of the house had the problem of requiring a larger structure which caused cost increase.

Further, the curtain film having an opening or openings as described in patent document 1 had the problem that air passed through the house through the opening or openings whereby the heat insulation effect of the house was small.

Further, in a house formed by stretching double films on the frame, in which a bag-like space was formed between the double films so that the heat insulation effect was increased by blowing air in the house into the bag-like space, if the above-mentioned opening or openings were formed, air escapes through the opening or openings. Accordingly, it was impossible to maintain the films in a stretched state.

On the other hand, the house described in patent document 2 had such disadvantages that since the upper edge portion of the inner covering material of the house was overlapped with the outer covering material with a predetermined distance, without complete close contact, the heat insulation effect was reduced because of the ventilation of air through the space portion, and when double films were stretched to form a bag-like space between these films, air in the bag-like space escaped through the space portion, and accordingly, it was impossible to maintain the films in a stretched state.

Further, since the inner covering material of the house is overlapped with the outer covering material with a predetermined distance, when the overlapped portion is fixed to the frame, the strength of holding the materials at the fixing portion is small and the wind pressure resistance of the building is small.

It is an object of the present invention to provide a building covered with resin films capable of discharging condensed water produced on the surface of the film facing the inside of the building, to the outside of the building.

To achieve the above-mentioned object, the present invention is to provide a building covered with resin films comprising a frame constituting the bone structure of a building and a roof and/or a wall formed by stretching resin films on the frame, characterized in that the lower edge portion of a resin film is held by a retainer to fix it to the frame and a water-permeable sheet is put with its upper edge portion being positioned at the inner surface side of the resin film and its lower edge portion being positioned at the outside of the building.

According to the above-mentioned invention, condensed water on the inner surface side of the film flows downward along the inner surface side to reach the lower edge portion of the film to be absorbed in the water-permeable sheet. Since the water-permeable sheet is held together with the film by the retainer, the absorbed water moves from the inside of the building to the outside due to a capillary phenomenon whereby the water can be discharged to the outside thereof.

According to a preferred aspect of the present invention, the retainer is provided at a position where upper and lower resin films are overlapped so that the lower edge portion of the upper resin film is positioned at the outer side of the upper edge portion of the lower resin film, and the water-permeable sheet is inserted between the upper and lower resin films so that its upper edge portion is positioned at the inner surface side of the upper resin film, and its lower edge portion is positioned at the outer surface side of the lower resin film.

According to the above-mentioned aspect, the condensed water falling along the inner surface side of the upper resin film is absorbed into the upper edge portion of the water-permeable sheet, the absorbed water moves to the lower edge portion of the sheet due to the capillary phenomenon, and flows onto the outer surface side of the lower resin film, whereby the condensed water can effectively be discharged to the outside of the building.

According to a more preferred aspect of the present invention, each of the resin films comprises double films which form a bag-like space into which air is introduced, the retainer is provided at the position to hold the lower edge portion of the double films, and the water-permeable sheet is inserted in the space formed by a pair of double films so that the upper edge portion is positioned in the double films, and the lower edge portion is positioned at the outer side of the building.

According to the above-mentioned aspect, the double films can assume a stretched state by air introduced between the double films, and the heat insulation resistance of the building can be increased. Further, condensed water falling along the inner surface side of the double films is absorbed into the upper edge portion of the water-permeable sheet at the lower edge portion of the double films. The absorbed water moves to the lower edge portion of the water-permeable sheet due to the capillary phenomenon to be discharged to the outside of the double films.

According to a more preferred aspect of the present invention, the water-permeable sheet is a mesh sheet made of a twisted strand.

According to the above-mentioned aspect, a fine gap is formed between the water-permeable sheet and the resin film because the twisted strand is not crushed even when the both sheets are pressed by the retainer. Accordingly, the capillary phenomenon takes place effectively, and water falling along the inner surface side of the resin film can be discharged effectively to the outside of the building.

According to a preferred aspect of the present invention, the resin film is a transparent resin film.

According to the above-mentioned aspect, excellent permeability of light can be assured when a resin film is required to transmit a sufficient amount of light.

In drawing:

FIGS. 1 to 7 show an agricultural house (greenhouse) as an embodiment of the building covered with resin films according to the present invention.

Figure 1:
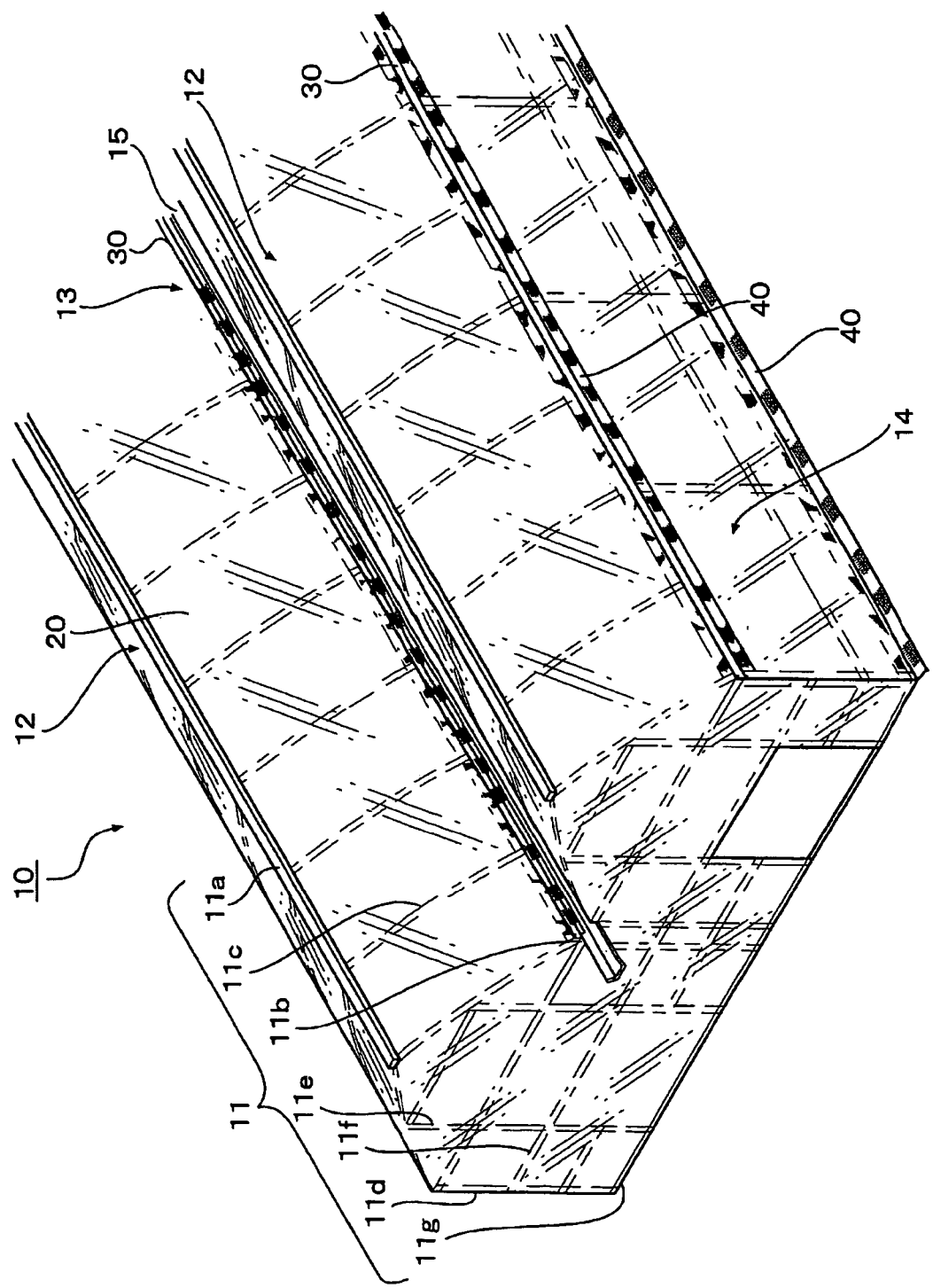
FIG. 1 is a perspective view showing an embodiment of the present invention applied to an agricultural house.
Figure 2:
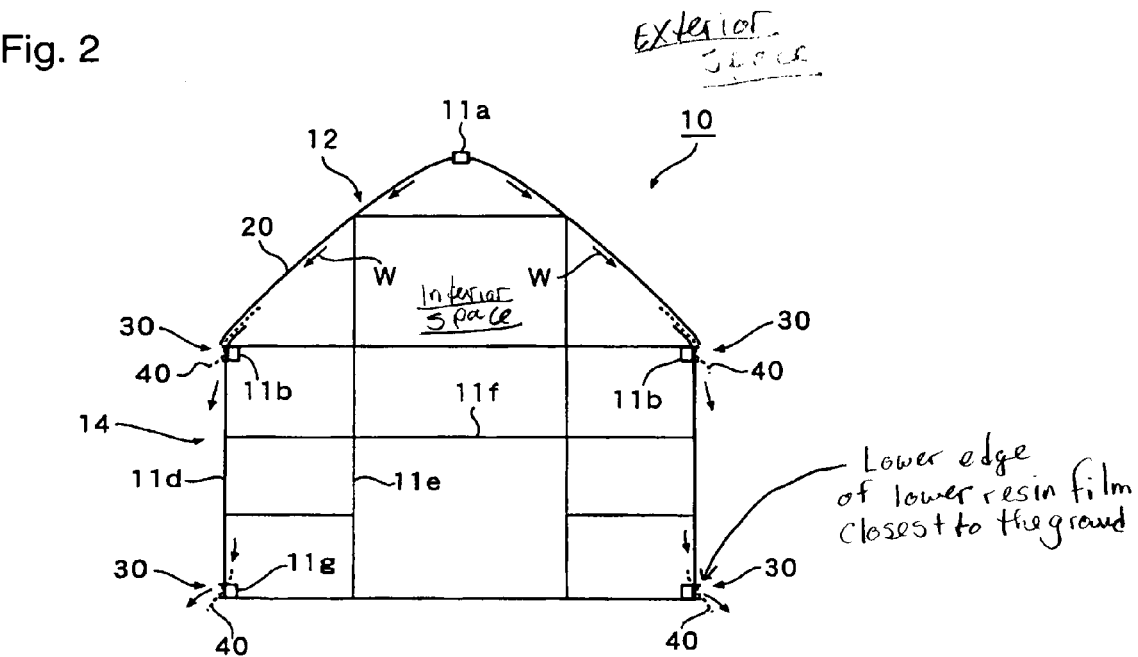
FIG. 2 is a front view of the agricultural house.
Figure 3:
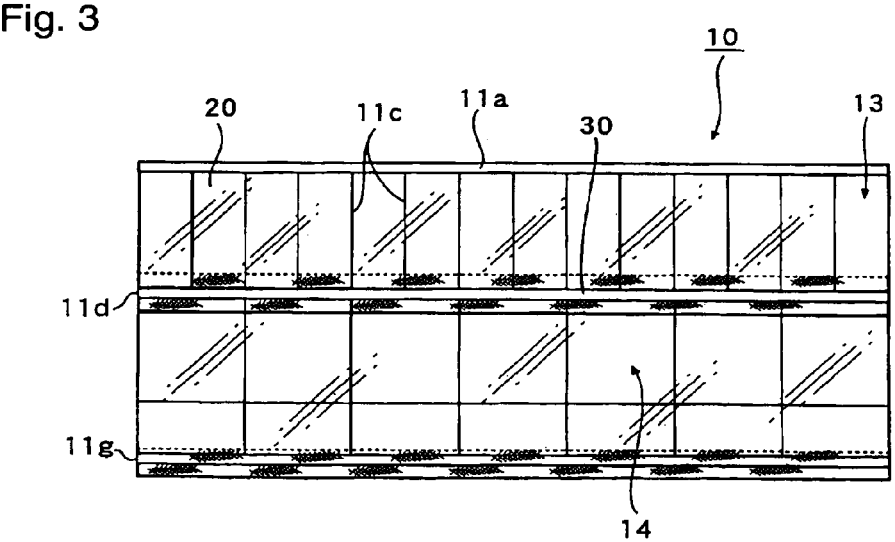
FIG. 3 is a side view of the agricultural house.

As shown in FIGS. 1 to 3, the house 10 has a frame 11 comprising metal pipes, metal angles and so on. The frame 11 has roof portions each constituted by ridge beams 11a, pole plates 11b, rafters 11c and so on and wall portions each constituted by posts 11d, studs 11e, furring stripes 11f, floor beams 11g and so on. Transparent resin films 20 are stretched on the outer circumference of the frame 11 to form the house 10. Further, in the case of a row house style as shown in FIG. 1, a valley portion 13 is formed between roofs 12, 12 adjacent to each other. Walls 14 are formed at lower portions of the roofs 12. The frame 11 is not limited to one having a doubled roof as shown in FIG. 1, but may be a well-known type having an arched roof.

The resin film may, for example, be a PVC (polyvinyl chloride) film, a PE (polyethylene) film, a PET (polyethylene terephthalate) film, a fluorine-containing resin film or a PVAc (polyvinyl acetate) film. Among these, preferred is the PVC film, the PET film or the fluorine-containing resin film, and particularly preferred is the fluorine-containing resin film.

Here, "the fluorine-containing resin" means generally a synthetic resin obtained by polymerizing olefin containing fluorine. In the present invention, generally, such one having a fluorine content of at least 45 mass %, particularly, at least 50 mass % is suitably used. The fluorine resin may, for example, be ethylene/tetrafluoroethylene copolymer, ethylene/chlorotrifluoroethylene copolymer, hexafluoropropylene/tetrafluoroethylene copolymer, perfluoroalkyl vinyl ether/tetrafluoroethylene copolymer, polyvinylidene fluoride or polyvinyl fluoride. Either compound is usable in the present invention. In particular, the ethylene/tetrafluoroethylene copolymer is suitably used.

The ethylene/tetrafluoroethylene copolymer comprises ethylene and tetrafluoroethylene as major components (the molar ratio of ethylene/tetrafluoroethylene is generally from 40/60 to 60/40), and a small amount (generally, at most 10 mol %) of the third comonomer component is copolymerized thereto, if the case requires. In the present invention, particularly, an ethylene/tetrafluoroethylene copolymer having a molar ratio of ethylene/tetrafluoroethylene in a range of from 40/60 to 60/40, preferably, in a range of from 45/55 to 55/45, and a perfluoroalkyl vinyl monomer unit (for example, a unit induced from $CH_2=CH-C_4H_9$ or $CH_2=CH-C_6H_{13}$) represented by the formula $CH_2=CH-C_nF_{2n+1}$ (where n is an integer of from 2 to 10) in a range of from 0.1 to 10 mol %, preferably, in a range of from 0.3 to 5 mol %, is suitably used.

The ethylene/tetrafluoroethylene copolymer itself is known, and can be produced by the method described in, for example, JP-B-59-50163. Further, a commercial item sold in the tradename of "AFLON COP" by Asahi Glass Company, Limited may be used. The fluorine resin described above can be formed into a film according to a well-known method, e.g., an extrusion method, an inflation method.

The thickness of the resin film is preferably from 10 to 700 μm, more preferably from 20 to 500 μm, further preferably from 40 to 300 μm.

The transparent resin films 20 are overlapped at a pole plate 11b near both a roof 12 and a wall 14, and the overlapped portion of upper and lower films 20a, 20b is fixed by a retainer 30. Further, the lower edge portion of the lower film 20b is also fixed by a retainer 30 at a floor beam 11g or the like located at the lower end of the wall 14.

Figure 4:
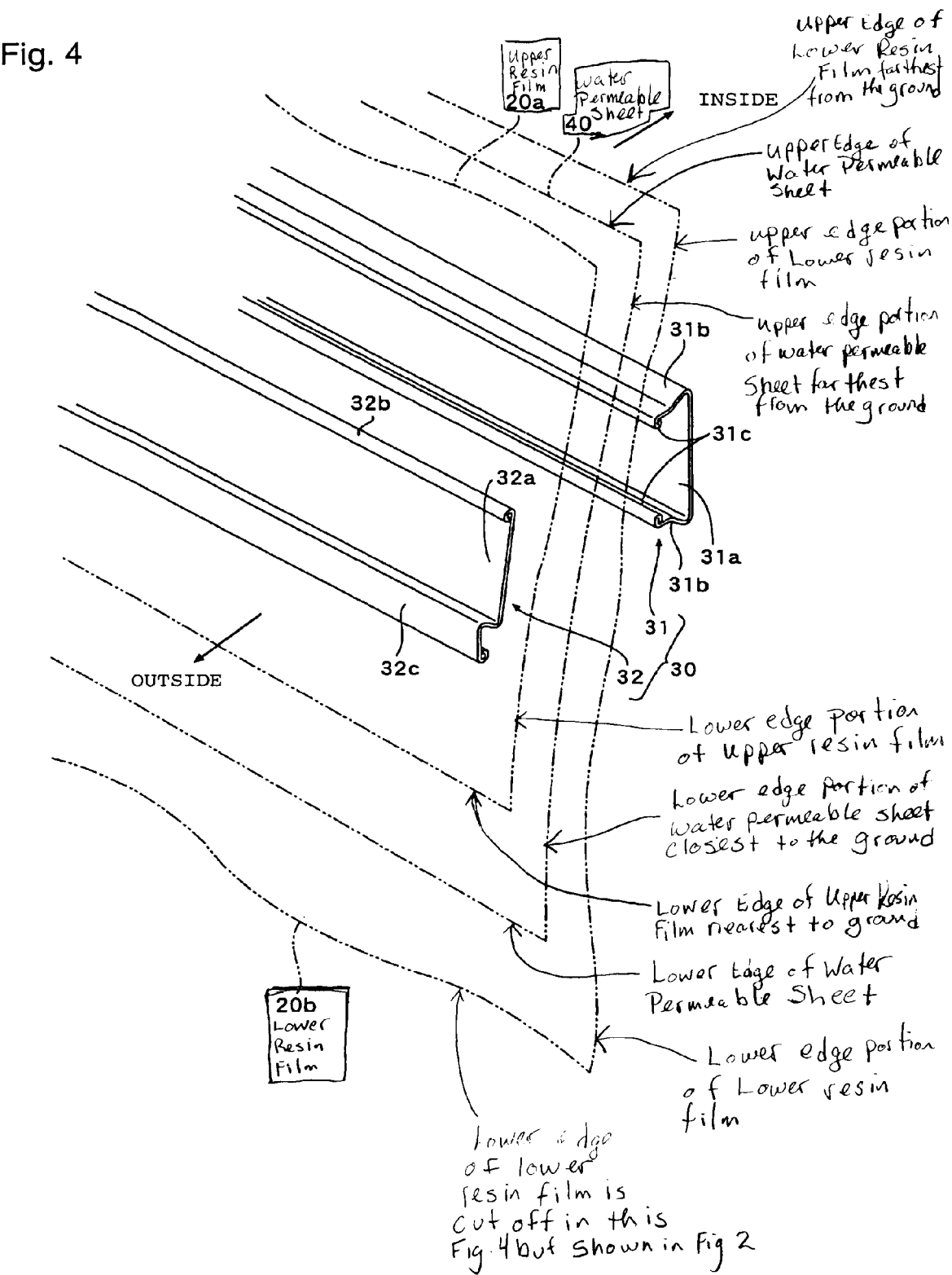
FIG. 4 is a perspective view showing a film retaining structure by the retainer in the agricultural house.
Figure 5:
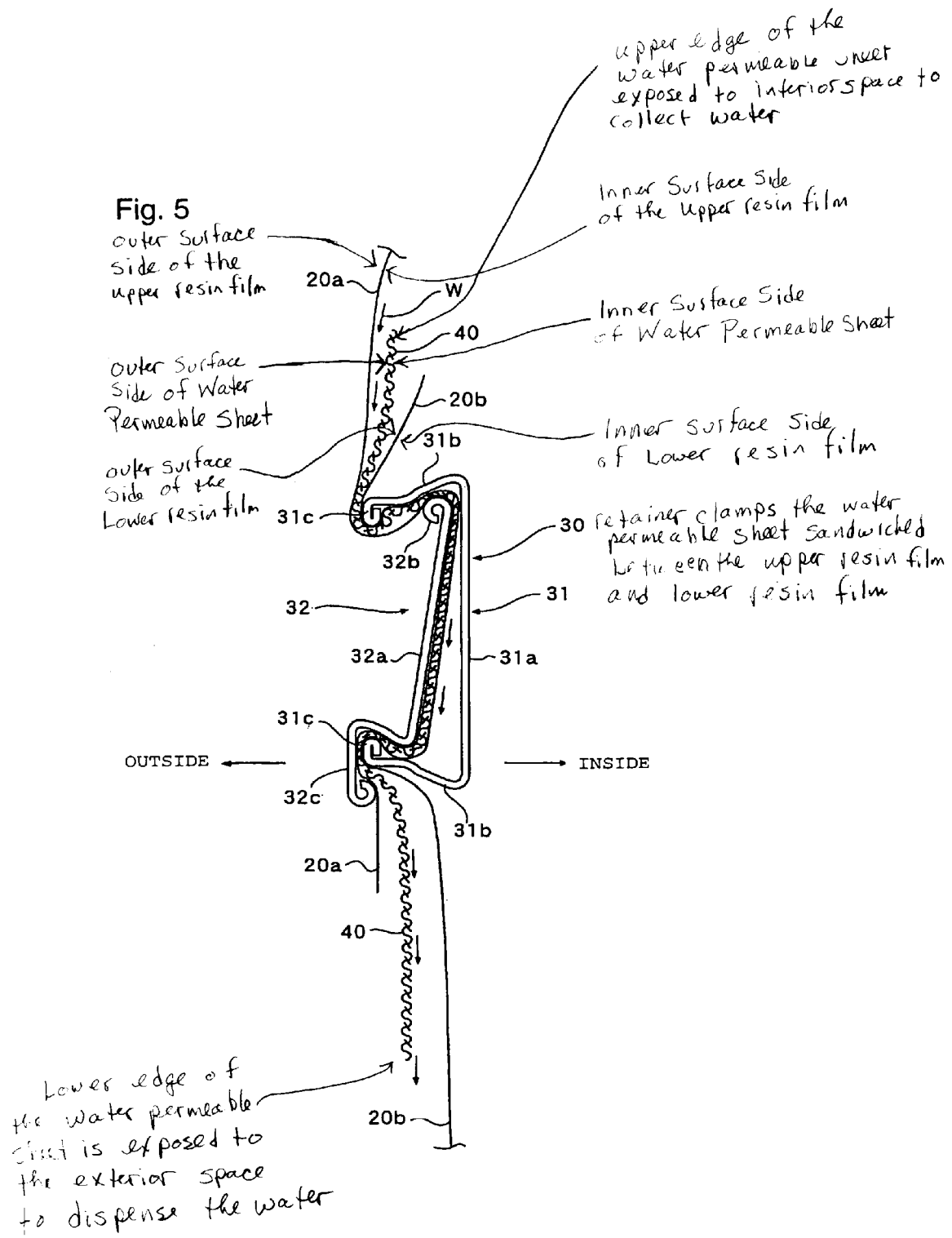
FIG. 5 is a cross-sectional view of the film retaining structure.
Figure 6:
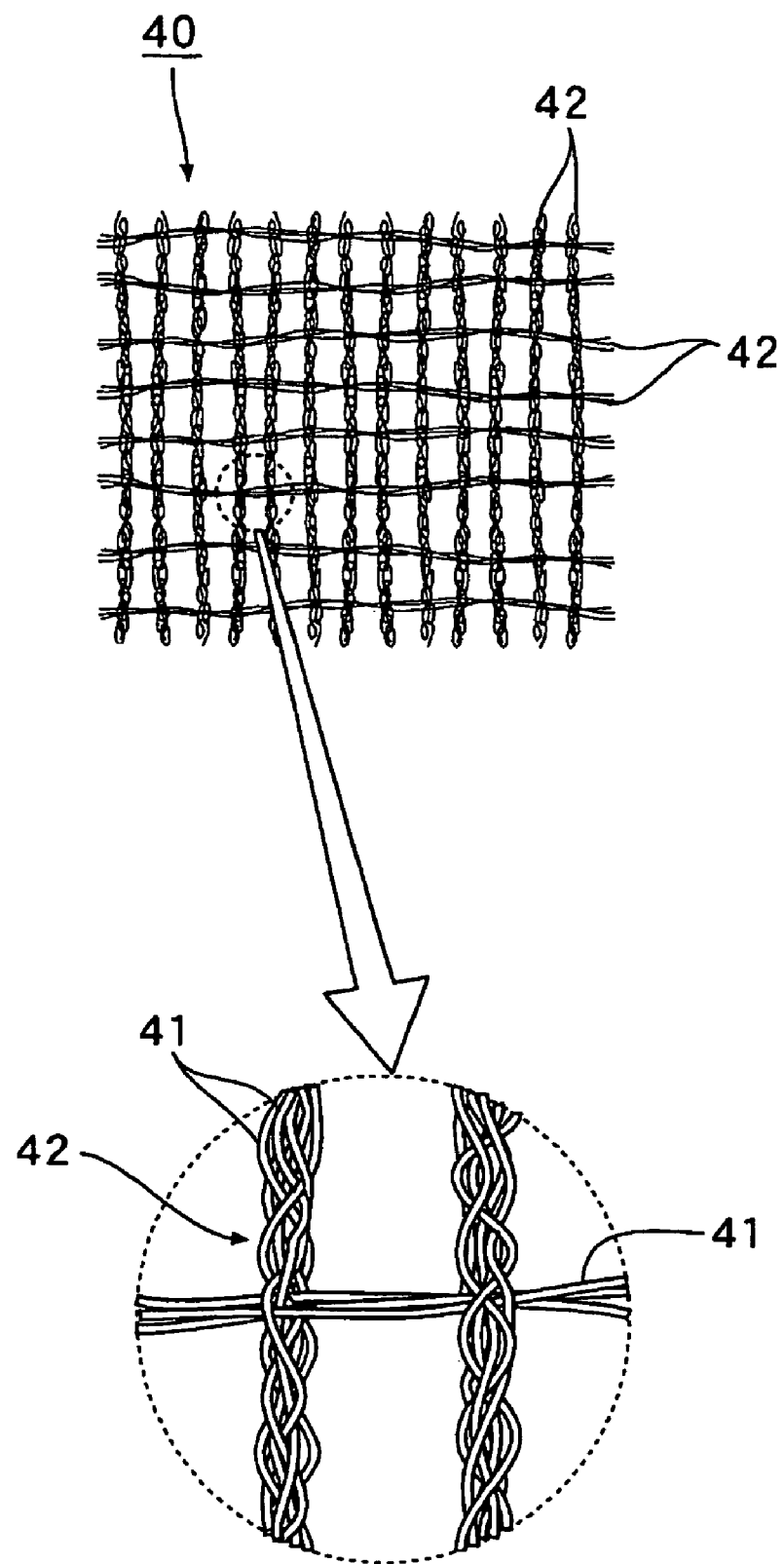
FIG. 6 is a diagram showing an example of the water-permeable sheet to be sandwiched between films at the retainer.

A retaining structure for retaining the upper and lower films 20a, 20b at the pole plate 11b will be described. As shown in FIGS. 4 and 5, the retainer 30 comprises a fixing plate 31 fixed to the pole plate 11b or the like and a retaining plate 32 to be fitted to the fixing plate 31. The fixing plate 31 is constituted by a base plate portion 31a made of an elongated plate, both side portions 31b bent into a channel form and edge portions 31c formed by bending further the both ends of the both side portions 31b toward an inner side. The retaining plate 32 has a base plate portion 32a made of an elongated plate, a side portion with its curled edge at one side and a side portion 32c bent into an L-like shape at the other side. Specifically, the side portion 32c is so formed as to bent the base plate portion 32a with an acute angle toward its one surface side, and to bend it again toward an outer side so as to be parallel to the base plate portion 32 wherein its free end is curled so as to project to the side opposite to the surface bent with an acute angle.

A water-permeable sheet 40 is sandwiched between the lower edge portion of the upper film 20a and the upper edge portion of the lower film 20b, and these three sheets are clamped between the fixing plate 31 and the retaining plate 32 to be fixed. In this case, these three sheets are arranged so that the lower edge portion of the upper film 20a takes the outermost position, the water-permeable sheet 40 is at an inner side of the upper film, and the upper edge portion of the lower film 20b is positioned at an inner side of the water-permeable sheet. The upper edge portion of the water-permeable sheet 40 is positioned at an inner surface side of the upper film 20a, and the lower edge portion thereof is positioned at an outer surface side of the lower film 20b.

The retaining plate 32 can be fitted to the fixing plate 31 by making the side 32b contact to the pocket portion formed by bending one of the side portions 31b of the fixing plate 31, making the other side portion 31b of the fixing plate 31 contact to the pocket portion formed by bending the secondly bent portion of the side portion 32c and forcibly pushing the retaining plate 32. In this case, between the fixing plate 31 and the retaining plate 32, the upper and lower films 20a, 20b and the water-permeable sheet 40 are clamped. Thus, these films are firmly held.

As shown in FIG. 5, the upper edge portion of the water-permeable sheet 40 is positioned at the inner surface side of the upper film 20a, namely, it faces an interior side of the house 10, and the lower edge thereof is positioned at an outer side of the lower film 20b, namely, it faces an exterior side of the house 10. As a result, water W condensed on the inner surface side of the upper film 20a falls along the surface and the water is absorbed from the upper edge portion of the water-permeable sheet 40. Then, the water infiltrates due to a capillary phenomenon to move to the lower edge portion of the sheet 40. Since the lower edge portion of the water-permeable sheet 40 is positioned at the exterior side of the house 10 as described above, the condensed water can be discharged to the outside of the house. In this embodiment, the water-permeable sheet 40 is preferably in a belt-like shape so as to be disposed over the entire length of the retainer 30.

Although the water-permeable sheet 40 is not in particular limited as far as it allows infiltration of water and discharges it to the outside of the house in a state secured by the retainer 30, woven fabric or non-woven fabric of synthetic resin filaments (such as polyethylene resin filaments), glass fibers, carbon fibers or the like is preferably employed. In particular, a netted sheet formed by twisting synthetic resin filaments is preferred. Such sheet may be a windbreak net for agricultural use, e.g., "Morika Windbreak Net" (tradename, manufactured by Morishita Kabushiki Kaisha).

The water-permeable sheet 40 is a mesh sheet formed by raschel-knitting (leno-knitting) twisted strands 42 of synthetic resin filaments 41 each having a thickness of from about 0.05 to 0.7 mm in which the size of each screen opening (the distance between adjacent twisted strands) is from about 1 to 50 mm. The water-permeable sheet 40 formed by such twisted strands 42 does not cause the collapse of the space between filaments 41 even when the sheet is clamped strongly by the retainer 30, and good capillary phenomenon can be provided whereby water filtrates well. The more preferable size of screen opening is from 1 to 25 mm.

Figure 7:
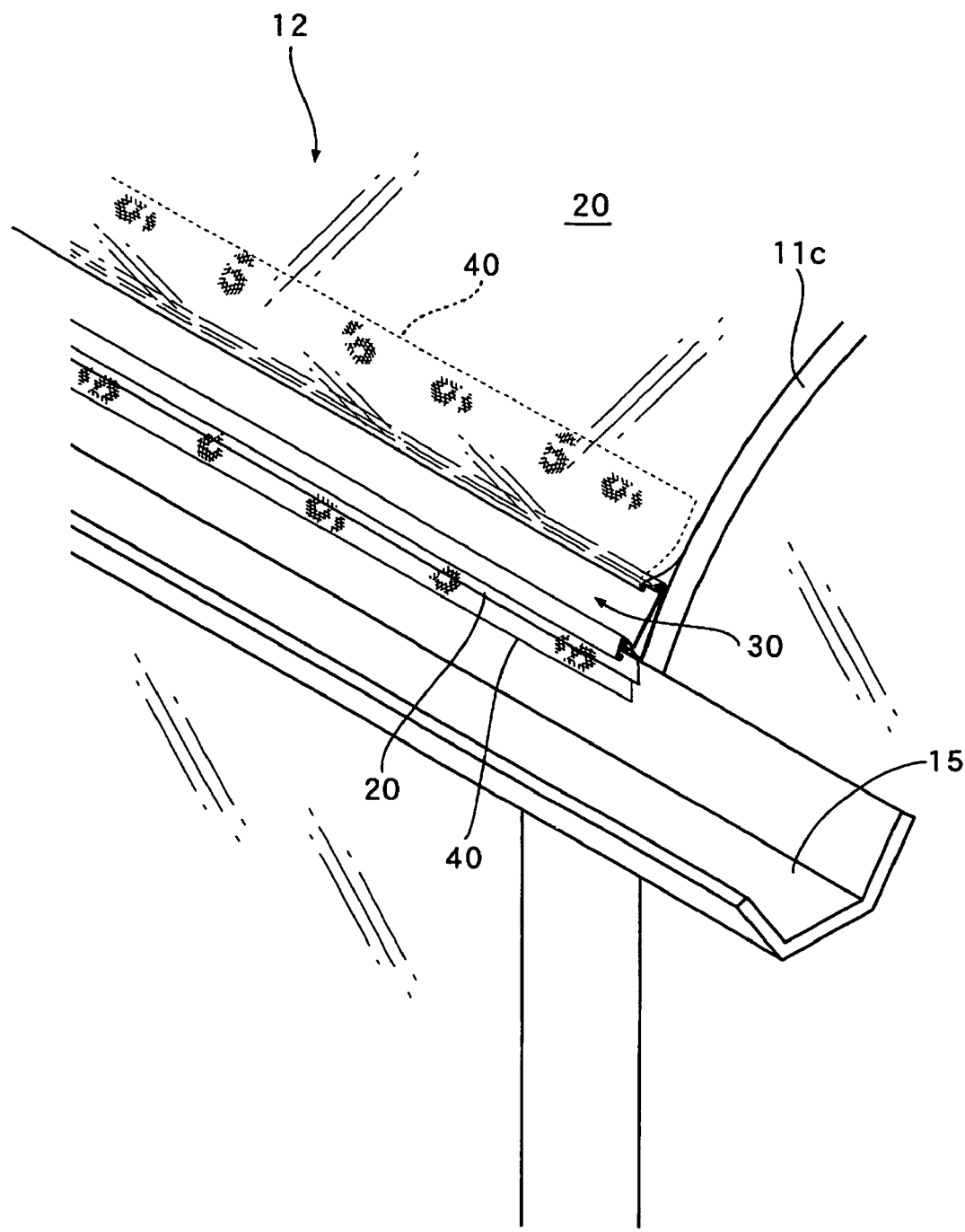
FIG. 7 is a perspective view showing the structure of a valley portion in the agricultural house.

FIG. 7 shows an embodiment of the retaining structure in which the lower edge portion of a transparent resin film 20 stretched on a roof 12 is fixed by a retainer 30 at a valley portion 13 formed between adjacent roofs 12. In this case, a watershoot 15 is disposed at the valley portion 13, and the lower edge portion of the transparent resin film 20 covering the roof 12 is fixed by the retainer 13 which is one arranged at both sides of the watershoot 15. In this case, the water-permeable sheet 40 is disposed at an inner surface side of the film 20 so that the upper edge of the sheet 40 projects to an upper portion of the retainer 30 at the interior side of the house, and the lower edge projects to a lower portion of the retainer 30 to extend onto the watershoot 15.

Accordingly, in the embodiment shown in FIG. 7, water condensed on the inner surface side of the film 20 stretched on the roof 12 and falling along the inner surface thereof is absorbed by the water-permeable sheet 40 at the upper portion of the retainer 30, the absorbed water infiltrates in the sheet 40 due to the capillary phenomenon and is discharged to the watershoot 15 from the lower edge of the water-permeable sheet 40. As a result, the water condensed on the inner surface side of the film 20 on the roof 12 of the house 10 can be transferred to the exterior side of the house to be discharged into the watershoot 15. The water collected in the watershoot 15 is moved in either direction on the watershoot 15 to be discharged through a drain pipe positioned at an end portion of the watershoot 15.

The water-permeable sheet 40 is also inserted between the parts of the retainer 30 arranged along a floor beam 11g so that water condensed on the inner surface side of the transparent resin film 20 constituting the wall 14 and falling along the inner surface, can be discharged to the outside of the house through a water-permeable sheet 40 inserted in the retainer arranged along the floor beam 11g.

FIGS. 8 to 11 show another embodiment of the present invention applicable to an agricultural house covered with double films.

In the agricultural house indicated by a symbol of 10a, double films 21, 22 are stretched to cover a frame 11. The double films 21, 22 are retained by a retainer 30 at their lower ends so that a bag-like space 23 is formed between them.

Figure 8:
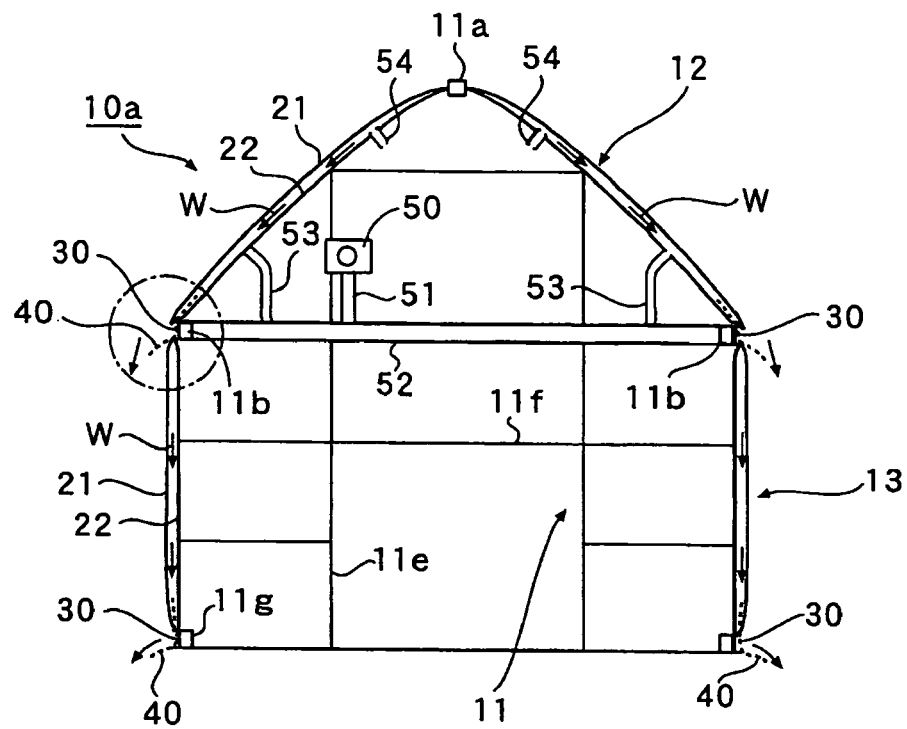
FIG. 8 is a front view showing another embodiment of the present invention applied to an agricultural house.
Figure 11:
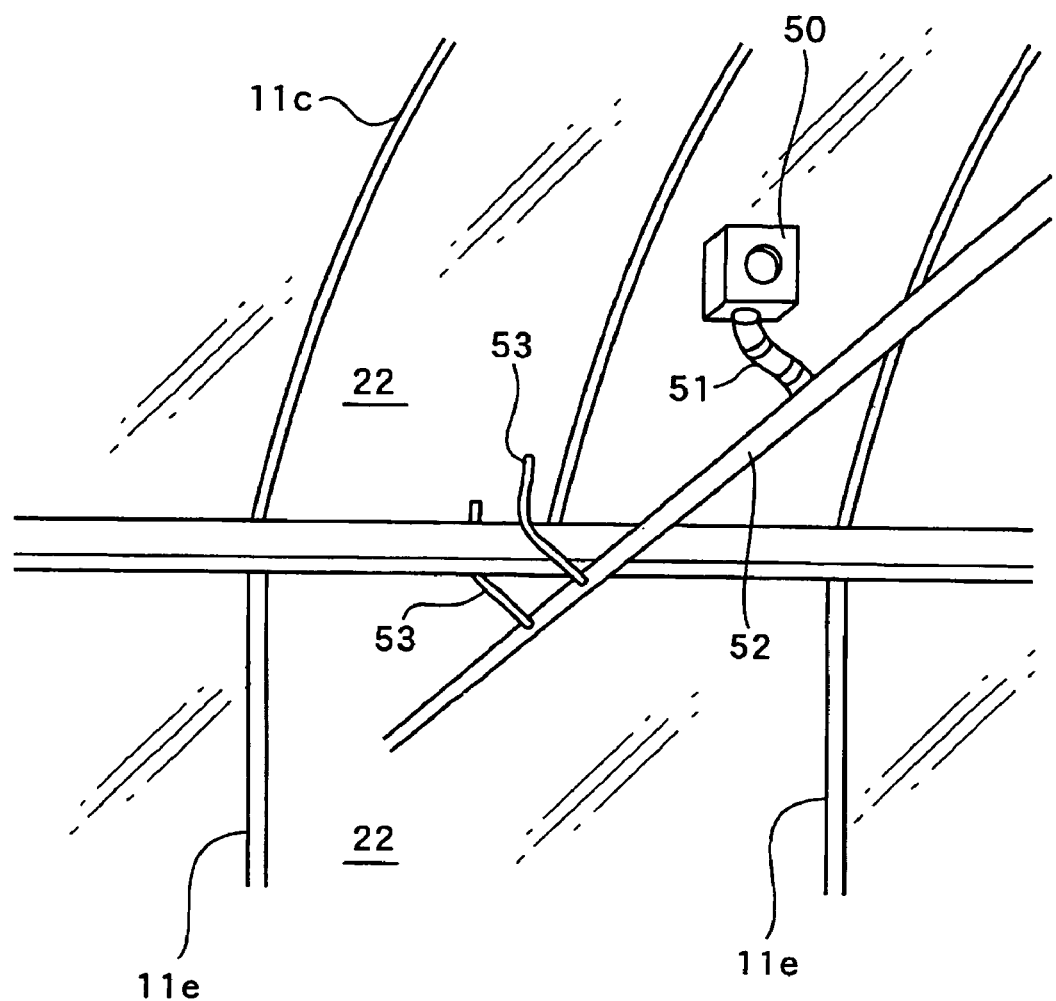
FIG. 11 is a diagram showing an air blowing apparatus for blowing air into the double films of the agricultural house.

As shown in FIG. 11, a blower 50 is disposed inside the house 10a, and the blower 50 is connected to a pipe 52 by means of a hose 51. The pipe 52 is connected with a plurality of air supply pipes 53, and free ends of the air supply pipes 53 are penetrated through the film 22 at the interior side of the house to extend in the bag-like space 23. As shown in FIG. 8, discharge pipes 54 are connected to the film 22 of the interior side to discharge supplied air to the interior side of the house.

Accordingly, air (warm air) supplied from the blower 50 to the inside of the house 10a is blown into the bag-like space 23 formed between the double films 21, 22 through the hose 51, the pipe 52 and air supply pipes 53 to inflate the double films 21, 22 in a stretched state, and is returned to the inside of the house 10a through the discharge pipes 54. Thus, by stretching the double films 21, 22, the heat insulation effect for the house 10a can further be increased.

However, this house 10a may have the problem that condensed water is produced particularly on an inner surface side of the film 21 of the outside among the double films, and the condensed water gathers at the lower edge portion of the double films 21, 22. Further, if algae are produced in the gathered water between the films and if the double films 21, 22 are transparent resin films, the transmission of light may be blocked.

Figure 9:
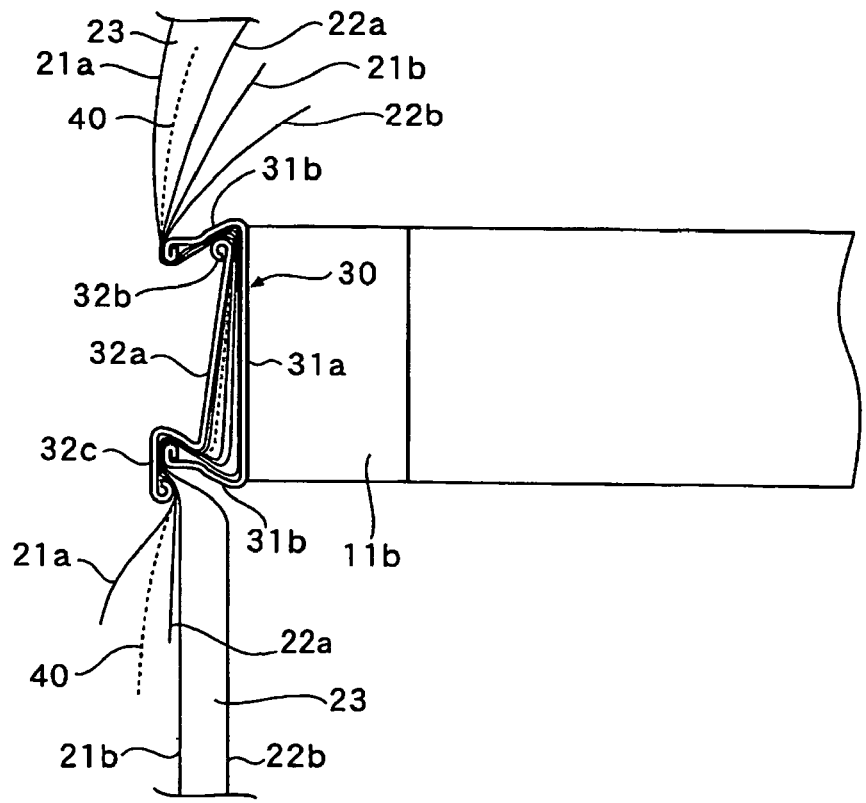
FIG. 9 is a cross-sectional view showing a film retaining structure by a retainer in the agricultural house.
Figure 10:
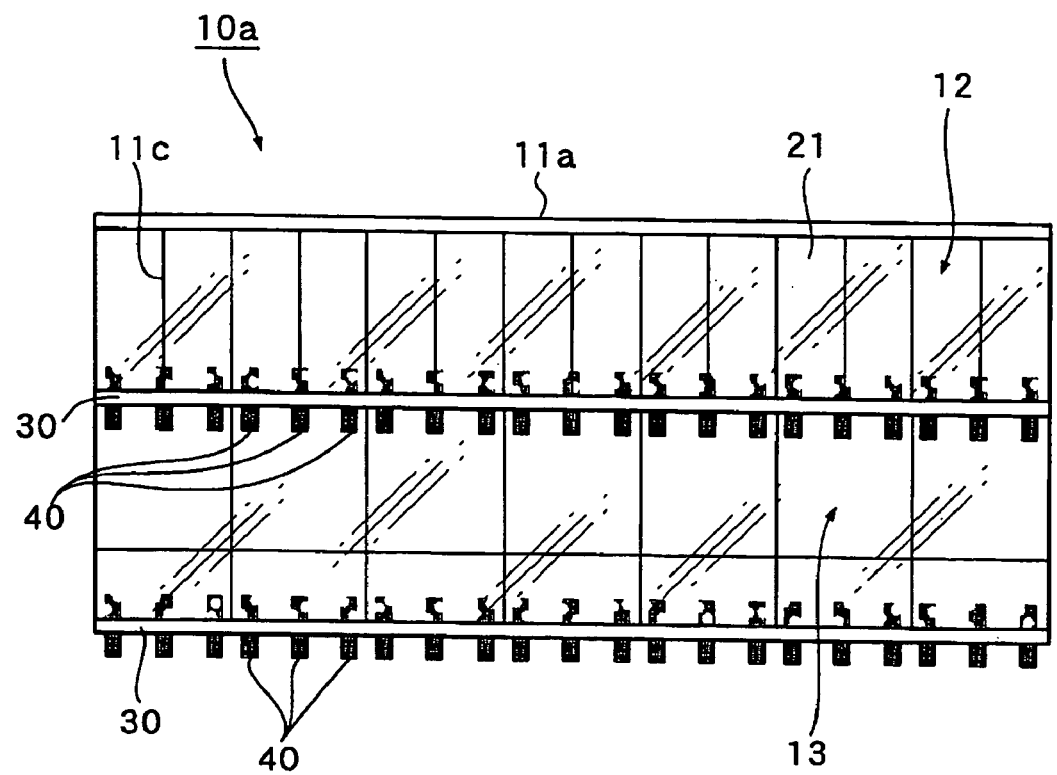
FIG. 10 is a side view of the agricultural house.

In order to avoid this, in the present invention, rectangular water-permeable sheets 40 are interposed with predetermined intervals at the lower edge portion of the double films 21, 22. Namely, as shown in FIG. 9 showing, for example, a portion of pole plate 11b at which upper double films 21a, 22a and lower double films 21b, 22b are fixed by the retainer 30, the lower edge portion of the upper double films 21a, 22a is positioned so as to be outside the upper edge portion of the lower double films 21b, 22b, and a water-permeable sheet 40 is inserted between the upper double films 21a, 22a. The upper and lower double films and the water-permeable sheets are fixed by being pinched by the fixing plate 31 and the retaining plate 32 of the retainer 30. As a result, the upper edge portion of the water-permeable sheet 40 is disposed between the upper double films 21a, 22a, and the lower edge portion thereof is extended from the upper double films 21a, 22a and is positioned at the outside of the lower double films 21b, 22b.

With this arrangement, when water condensed between the upper double films 21a, 22a, in particular, on the inner surface side of the film 21a and falling along it reaches the lower edge portion of the double films 21a, 22a, the water is absorbed into the upper edge portion of the water-permeable sheet 40; it infiltrates in the water-permeable sheet 40 due to a capillary phenomenon, and it is discharged from the lower edge portion of the sheet 40 to the exterior of the house 10a. In this case, when the condensed water gathers to a certain extent in the lower end portion of the double films 21a, 22a, it spreads in a lateral direction. Accordingly, it is unnecessary to arrange the water-permeable sheet 40 over the entire length of the retainer 30, but it is sufficient to arrange the rectangular water-permeable sheets at predetermined intervals as explained in this embodiment.

The water-permeable sheet 40 is also arranged at the retainer 30 positioned at the floor beam 11g so that water condensed between the double films 21b, 22b constituting a wall 13 can be discharged from the lower edge portion of the films.

In the following, a preferred example of the present invention will be described. However, it should be understood that the present invention is by no means restricted by such specific Example.

EXAMPLE 1

In the agricultural house 10a having double films 21, 22 as shown in FIGS. 8 to 11, water-permeable sheets 40 of 30 cm square were pinched with intervals of 200 cm by retainers 30 arranged at a pole plate 11b and a floor beam 11g. The water-permeable sheets used were mesh sheets of "Morika Windbreak Net" (tradename, manufactured by Morishita Kabushiki Kaisha) which were formed by raschel-knitting (leno-knitting two warps and three wefts of polyethylene strands having a thickness of 330 dtx (300 denier) with a leno (warp) of 17 courses/inch (the size of screen opening: 1.5 mm).

1 Liter of water was poured between double films 21, 22 forming a section of the house 10a. The water could be discharged within only 10 seconds from the outside of the house through the water-permeable sheets 40 arranged at the lower edge portion of the double films.

COMPARATIVE EXAMPLE 1

The same agricultural house 10a as Example 1 was used provided that no water-permeable sheet 40 was used. Fiddlehead fern was cultivated in the house 10a. As a result, water condensed between double films 21, 22 gathers at the lower edge portion of the films and reaches a height of about 5 to 10 cm. In the water, algae and fundi produced so that sun beam was gradually blocked to cause trouble in the cultivation whereby the quality of the fiddlehead fern decreased and the yield was decreased.

COMPARATIVE EXAMPLE 2

The same agricultural house 10a as that of Comparative Example 1 was used. The water-permeable sheet 40 was not also used. Strawberry was cultivated in the house 10a. As a result, water condensed between the double films 21, 22 gathered at the lower edge portion thereof in the same manner as Comparative Example 1. In the water, algae and fundi produced so that sun beam was gradually blocked and the quality of the strawberry decreased, and the yield was decreased.

According to the present invention, water condensed on the surface of the resin film facing inside the building covered with the resin film can be discharged from the inside to the outside of the building because the water flows downward along the film surface; the water is absorbed by a water-permeable sheet provided at the lower edge portion of the film and the water reaches the lower edge portion of the water-permeable sheet due to a capillary phenomenon. Accordingly, the water condensed on the surface of the resin film can effectively be discharged to the outside of the building with a simple structure and without impairing the heat insulation effect. Further, since the water is discharged by means of the water-permeable sheet, it is unnecessary to provide a gap for water discharge between vertically overlapped films. Further, the lower edge portion of the film can be fixed by being forcibly pressed to the frame, the holding strength of the film and good discharging ability of water at the fixing portion can be satisfied.

The present invention can be applied to, for example, an agricultural house, a building covered with a resin film such as a house in an exhibition area, or the like.

The entire disclosure of Japanese Patent Application No. 2003-433368 filed on Dec. 26, 2003 including specification, claims, drawings and summary is incorporated herein by reference in its entirety.

What is claimed is:

1. A building assembly for providing a substantially enclosed structure which defines an interior space and an exterior space, the building assembly comprising:
    a frame constituting a bone structure of the building assembly;
    an upper resin film provided on the frame and extending along the frame to form at least part of a roof and/or wall of the building assembly, the upper resin film comprising:
        an inner surface side facing the interior space,
        an outer surface side facing the exterior space, and
        a lower edge portion consisting of a part of the upper resin film that extends in the direction of gravity from an intermediate point on the upper resin film to a lower edge of the upper resin film which is nearest to a ground that supports the building assembly;
    a lower resin film provided on the frame at a position nearer to the ground than the upper resin film and extending along the frame to form at least part of a roof and/or wall of the building assembly, the lower resin film comprising:
        an inner surface side facing the interior space,
        an outer surface side facing the exterior space,
        an upper edge portion consisting of a part of the lower resin film that extends against the direction of gravity from a first intermediate point on the lower resin film to an upper edge of the lower resin film which is farthest from the ground that supports the building assembly, and
        a lower edge portion spaced from the upper edge portion and consisting of a part of the lower resin film that extends in the direction of gravity from a second intermediate point on the lower resin film to a lower edge of the lower resin film which is nearest to the ground that supports the building assembly;
    a water-permeable sheet comprising:
        an inner surface side facing the interior space,
        an outer surface side facing the exterior space,
        an upper edge of the water permeable sheet which is farthest from the ground, and
        a lower edge of the water-permeable sheet which is nearest to the ground; and
    a retainer configured to clamp the upper resin film, the lower resin and the water permeable sheet together, wherein the retainer is provided at a position where the upper resin film and a lower resin film are overlapped so that the lower edge portion of the upper resin film is positioned at an exterior space side of the upper edge portion of the lower resin film, and the water-permeable sheet is sandwiched between the upper and lower resin films so that the upper edge of the water permeable sheet is exposed to the interior space to collect water from the interior space and the lower edge of the water permeable sheet is exposed to the exterior space to dispense the water to the exterior space such that the water permeable sheet provides a path for the water to move by capillary action from the interior space to the exterior space.

2. The building assembly according to claim 1, wherein the water-permeable sheet is a mesh sheet made of a twisted strand.

3. The building assembly according to claim 2, wherein a size of a screen opening of the mesh sheet is from 1 to 50 mm.

4. The building assembly according to claim 1, wherein the upper resin film or the lower resin film, or both the upper and lower resin films comprise a transparent resin film.

5. The building assembly according to claim 1, wherein the upper resin film or the lower resin film, or both the upper and lower resin films comprise a fluorine-containing resin film.

6. The building assembly according to claim 5, wherein the upper resin film or the lower resin film, or both the upper and lower resin films comprise an ethylene/tetrafluoroethylene copolymer film.

7. The building assembly according to claim 1, wherein:
the upper resin film or the lower resin film or both the upper and lower resin films includes two opposing films which form a space for containing a volume of air, and
the retainer is provided at a position to hold the two opposing films and the water-permeable sheet together such that the upper edge of the water-permeable sheet is inserted in the space formed by the two opposing films, and the lower edge of the water permeable sheet is exposed to the exterior space.

8. The building assembly-according to claim 7, wherein the water-permeable sheet is a mesh sheet made of a twisted strand.

9. The building assembly-according to claim 8, wherein the size of a screen opening of the mesh sheet is from 1 to 50 mm.

10. The building assembly according to claim 7, wherein at least one of the resin films is a transparent resin film.

11. The building assembly according to claim 7, wherein the upper resin film or the lower resin film, or both the upper and lower resin films comprise a transparent resin film.

12. The building assembly according to claim 11, wherein the upper resin film or the lower resin film, or both the upper and lower resin films comprise an ethylene/tetrafluoroethylene copolymer film.

13. The building assembly according to claim 1, wherein the lower edge portion of the water-permeable sheet extends below the lower edge portion of the upper resin film.

14. The building assembly according to claim 1, wherein the retainer comprises:
a fixing plate comprising a substantially planar base, a first end connected to the base and forming an acute angle with respect to the substantially planar base, and a second end connected to the base and forming an acute angle with respect to the substantially planar base of the fixing member; and
a retaining plate having a first end part configured to be located within the acute angle formed by the first end of the fixing plate, and a second end part configured to extend beyond the second end of the fixing plate and be positioned outside the acute angle formed by the second end of the fixing plate, wherein the fixing plate is exposed to the interior space and the retaining plate is exposed to the exterior space.

15. A building assembly for providing a substantially enclosed structure which defines an interior space and an exterior space, the building assembly comprising:
a frame constituting a bone structure of the building assembly;
an upper resin film provided on the frame and extending along the frame to form at least part of a roof and/or wall of the building assembly, the upper resin film comprising:
an inner surface side facing the interior space,
an outer surface side facing the exterior space, and
a lower edge portion consisting of a part of the upper resin film that extends in the direction of gravity from an intermediate point on the upper resin film to a lower edge of the upper resin film which is nearest to a ground that supports the building assembly;
a water-permeable sheet comprising:
an inner surface side facing the interior space,
an outer surface side facing the exterior space,
an upper edge of the water permeable sheet which is farthest from the ground that supports the building assembly, and
a lower edge of the water-permeable sheet which is nearest to the ground that supports the building assembly; and
a retainer configured to clamp the upper resin film and the water permeable sheet together, wherein the retainer is provided at a position where the upper resin film and the water permeable sheet are overlapped such that the lower edge portion of the upper resin film is positioned at an exterior space side of the water-permeable sheet, the upper edge of the water permeable sheet is exposed to the interior space to collect water from the interior space and the lower edge of the water permeable sheet is exposed to the exterior space to dispense the water to the exterior space, such that the water permeable sheet provides a path for the water to move by capillary action from the interior space to the exterior space.

16. The building assembly according to claim 15, wherein the water-permeable sheet is a mesh sheet of a twisted strands and has a mesh screen opening size of from 1 to 50 mm.

17. The building assembly according to claim 15, wherein at least one of the resin films is a transparent resin film.

18. The building assembly according to claim 15, wherein the resin film is a fluorine-containing resin film.

19. The building assembly according to claim 18, wherein the resin films is an ethylene/tetrafluoroethylene copolymer film.

20. A building assembly for providing a substantially enclosed structure which defines an interior space and an exterior space, the building assembly comprising:
a frame constituting a bone structure of the building assembly;
an upper resin film provided on the frame and extending along the frame to form at least part of a roof and/or wall of the building assembly, the upper resin film comprising:
an inner surface side facing the interior space,
an outer surface side facing the exterior space, and
a lower edge portion consisting of a part of the upper resin film that extends in the direction of gravity from an intermediate point on the upper resin film to a lower edge of the upper resin film which is nearest to a ground that supports the building assembly;
a water-permeable sheet comprising:
an inner surface side facing the interior space,
an outer surface side facing the exterior space, an upper edge of the water permeable sheet which is farthest from the ground that supports the building assembly, and a lower edge of the water-permeable sheet which is nearest to the ground that supports the building assembly; and means for clamping the upper resin film and the water permeable sheet together such that the water permeable sheet provides a path for water to move by capillary action from the interior space to the exterior space.

* * * * *